(12) United States Patent
Coleridge et al.

(10) Patent No.: US 7,019,041 B2
(45) Date of Patent: Mar. 28, 2006

(54) RADIATION-CURABLE COMPOSITIONS CONTAINING ALTERNATING COPOLYMERS OF ISOBUTYLENE-TYPE MONOMERS

(75) Inventors: Edward R. Coleridge, Lower Burrell, PA (US); Roy E. Dean, Lower Burrell, PA (US); M. Lisa Perrine, Allison Park, PA (US); Truman F. Wilt, Clinton, PA (US); Michael J. Ziegler, Pittsburgh, PA (US)

(73) Assignee: PPG Industries Ohio, Inc.

( * ) Notice: Subject to any disclaimer, the term of this patent is extended or adjusted under 35 U.S.C. 154(b) by 194 days.

(21) Appl. No.: 10/357,791

(22) Filed: Feb. 4, 2003

(65) Prior Publication Data

US 2003/0199640 A1   Oct. 23, 2003

Related U.S. Application Data

(63) Continuation-in-part of application No. 10/077,645, filed on Feb. 15, 2002, now Pat. No. 6,784,248.

(51) Int. Cl.
*C08F 2/46* (2006.01)

(52) U.S. Cl. ............................ 522/44; 522/46; 522/68; 522/154

(58) Field of Classification Search ................ 522/44, 522/46, 68, 154
See application file for complete search history.

(56) References Cited

U.S. PATENT DOCUMENTS

| | | | |
|---|---|---|---|
| 2,378,629 A | 6/1945 | Hanford | 260/78 |
| 2,411,599 A | 11/1946 | Sparks et al. | 204/162 |
| 2,531,196 A | 11/1950 | Brubaker et al. | 260/85.5 |
| 3,947,338 A | 3/1976 | Jerabek et al. | 204/181 |
| 3,984,299 A | 10/1976 | Jerabek | 204/181 |
| 4,025,407 A | 5/1977 | Chang et al. | 204/159.14 |
| 4,043,953 A | 8/1977 | Chang et al. | 260/18 S |
| 4,147,679 A | 4/1979 | Scriven et al. | 260/29.2 TN |
| 4,147,685 A | 4/1979 | Smith, Jr. | 260/31.2 R |
| 4,147,688 A | 4/1979 | Makhlouf et al. | 260/33.6 EP |
| 4,177,301 A | 12/1979 | Smith, Jr. | 427/401 |
| 4,220,679 A | 9/1980 | Backhouse | 427/401 |
| 4,403,003 A | 9/1983 | Backhouse | 427/407.1 |
| 4,707,515 A | 11/1987 | Gilch et al. | 524/506 |
| 4,889,890 A | 12/1989 | Kerr et al. | 525/113 |
| 4,910,255 A | 3/1990 | Wakabayashi et al. | 525/100 |
| 4,937,288 A | 6/1990 | Pettit, Jr. et al. | 525/176 |
| 4,997,900 A | 3/1991 | Brinkman | 528/45 |
| 5,071,904 A | 12/1991 | Martin et al. | 524/458 |
| 5,098,955 A | 3/1992 | Pettit, Jr. | 525/194 |
| 5,202,382 A | 4/1993 | Pettit, Jr. | 525/108 |
| 5,214,101 A | 5/1993 | Pettit, Jr. et al. | 525/176 |
| 5,356,973 A | 10/1994 | Taljan et al. | 524/314 |
| 5,407,707 A | 4/1995 | Simeone et al. | 427/410 |
| 5,424,380 A | 6/1995 | Doi | 526/262 |
| 5,439,896 A | 8/1995 | Ito et al. | 525/107 |
| 5,508,337 A | 4/1996 | Wamprecht et al. | 524/507 |
| 5,510,444 A | 4/1996 | Halpaap et al. | 528/45 |
| 5,512,634 A | 4/1996 | Doi | 525/182 |
| 5,541,259 A | 7/1996 | Doi | 525/175 |
| 5,552,487 A | 9/1996 | Clark et al. | 525/131 |
| 5,554,692 A | 9/1996 | Ross | 525/124 |
| 5,663,240 A | 9/1997 | Simeone et al. | 525/327.3 |
| 5,710,214 A | 1/1998 | Chou et al. | 525/124 |
| 5,777,061 A | 7/1998 | Yonek et al. | 528/45 |
| 5,807,937 A | 9/1998 | Matyjaszewski et al. | 526/135 |
| 5,976,701 A | 11/1999 | Barancyk et al. | 428/423.1 |
| 5,989,642 A | 11/1999 | Singer et al. | 427/407.1 |

(Continued)

FOREIGN PATENT DOCUMENTS

CZ       290 817       10/2002

(Continued)

OTHER PUBLICATIONS

Greenly, "Q and e Values for Free Radical Copolymerizations of Vinyl Monomers and Telogens," *Polymer Handbook*, Fourth Edition, John Wiley & Sons, Inc., pp. 309-319, 1999.

(Continued)

*Primary Examiner*—Bernard Lipman
(74) *Attorney, Agent, or Firm*—William J. Uhl

(57) ABSTRACT

A composition that includes a copolymer containing residues having the following structural units (I):

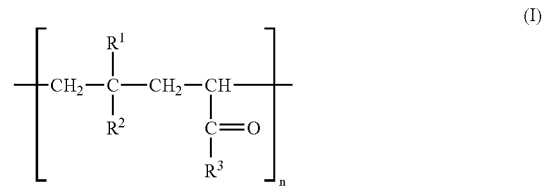

where n is an integer from 1 to 10,000; $R^1$ is linear or branched $C_1$ to $C_4$ alkyl; $R^2$ is selected from the group consisting of methyl, linear, cyclic, or branched $C_2$ to $C_{20}$ alkyl, alkenyl, aryl, alkaryl, and aralkyl; and $R^3$ is a moiety comprising a group that is capable of undergoing a polymerization reaction when exposed to actinic radiation or ionizing radiation. The composition may be used to coat a substrate by providing a substrate; applying a layer of a radiation-curable composition that includes the copolymer described above over at least a portion of a surface of the substrate; and curing the radiation-curable composition by exposing the layer to actinic radiation in an amount sufficient to effect curing of the radiation-curable composition.

42 Claims, No Drawings

U.S. PATENT DOCUMENTS

| | | | | |
|---|---|---|---|---|
| 6,054,502 | A | 4/2000 | Friedlander et al. | 522/96 |
| 6,111,001 | A | 8/2000 | Barancyk et al. | 524/211 |
| 6,114,489 | A | 9/2000 | Vicari et al. | 528/84 |
| 6,281,272 | B1 | 8/2001 | Baldy et al. | 523/501 |
| 6,414,077 | B1 | 7/2002 | Barron et al. | 524/588 |

FOREIGN PATENT DOCUMENTS

| | | |
|---|---|---|
| DE | 42 36 816 | 5/1993 |
| GB | 1 338 133 | 11/1973 |
| GB | 1 495 674 | 12/1977 |
| JP | 61 028544 | 2/1986 |
| JP | 61-28544 * | 8/1986 |
| JP | 2000 159848 | 6/2000 |
| JP | 2000 191722 | 7/2000 |

OTHER PUBLICATIONS

Odian, "Chain Copolymerization," *Principles of Polymerization*, Third Edition, John Wiley & Sons, Inc., pp. 452-491, 1991.

Cowie, *Alternating Copolymers*, Plenum Press, pp. 1-137, 1985.

Rzaev et al., "Complex-Radical Copolymerization of 2,4,4-trimethylpentene-1 with Maleic Anhydride," *Eur. Polym. J.*, vol. 34, No. 7, pp. 981-985, 1998.

Mashita et al., "Alternating Copolymerization of Isobutylene and Acrylic Ester with Alkylboron Halide," *Polymer*, vol. 36, No. 15, pp. 2973-2982, 1995.

Mashita et al., "Alternating Copolymers of Isobutylene and Acrylic Ester by Complexed Copolymerization," *Polymer*, vol. 36, No. 15, pp. 2983-2988, 1995.

Kuntz et al., "Poly[2,2-Dimethyl-4-(methoxylcarbonyl) butylene]: Synthesis with an Ethylaluminum Sesquichloride-Peroxide Initiator and NMR Characterization," *J. of Polymer Science: Polymer Chemistry Edition*, vol. 16, pp. 1747-1753, 1978.

Hirooka et al., "Complexed Copolymerization of Vinyl Compounds with Alkylaluminum Halides," *Journal of Polymer Science: Polymer Chemistry Edition*, vol. 11, pp. 1281-1306, 1973.

ASTM D-1200—94, "Standard Test Method for Viscosity by Ford Viscosity Cup," *Amer. Soc. Test. Mat.*, pp. 103-105, 1994.

ASTM D-2369—92, "Standard Test Method for Volatile Content of Coatings," *Amer. Soc. Test. Mat.*, pp. 46-48, 1992.

ASTM D-3359—97, "Standard Test Methods for Measuring Adhesion by Tape Test," *Amer. Soc. Test. Mat.*, pp. 1-7, 1998.

ASTM D-4370—84, "Standard Test Methods for Acid and Base Milliequivalent Content of Electrocoat Bath," *Amer. Soc. Test. Mat.*, pp. 780-782, 1984.

"Reference Method 24: Determination of Volatile Matter Content, Water Content, Density, Volume Solids, and Weight Solids of Surface Coatings," *Federal Register*, EPA Reference Methods 24 and 24 A, vol. 57, No. 133, pp. 125-127, 1992.

Davidson, *Exploring the Science, Technology and Applications of U.V. and F.B. Curing*, Sita Technology Limited, pp. 35-63, 1999.

* cited by examiner

RADIATION-CURABLE COMPOSITIONS CONTAINING ALTERNATING COPOLYMERS OF ISOBUTYLENE-TYPE MONOMERS

CROSS-REFERENCE TO RELATED APPLICATION

This application is a Continuation-in-Part of U.S. application Ser. No. 10/077,645, filed Feb. 15, 2002, U.S. Pat. No. 6,784,248, entitled "Thermosetting Compositions Containing Alternating Copolymers of Isobutylene-type Monomers," which is hereby incorporated by reference.

BACKGROUND OF THE INVENTION

1. Field of the Invention

The present invention relates generally to radiation-curable compositions that contain copolymers of vinyl monomers. More specifically, the present invention is directed to radiation-curable compositions that contain copolymers containing isobutylene-type monomers.

2. Description of Related Art

Radiation-curable compositions are formed from radiation-curable oligomers, which are themselves reaction products of polymerization reactions. These polymeric reaction products typically include a majority of the desired oligomer, but may also contain other components, including some unreacted and partially reacted components, as well as other polymeric reaction by-products.

Radiation curable compositions are used successfully in limited commercial applications. It would be desirable to provide radiation-curable compositions, containing radiation curable oligomers or monomers, that consistently provide coatings that have performance characteristics such as solvent or chemical resistance at reduced costs. It would further be desirable to provide radiation curable oligomers or monomers that demonstrate enhanced performance capabilities.

SUMMARY OF THE INVENTION

The present invention is directed to a composition that includes a non-gelled copolymer containing residues having the following structural units (I):

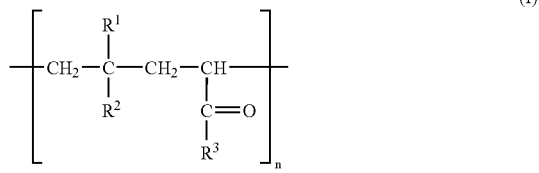

(I)

where n is an integer from 1 to 10,000; $R^1$ is linear or branched $C_1$ to $C_4$ alkyl; $R^2$ is selected from the group consisting of methyl, linear, cyclic, or branched $C_2$ to $C_{20}$ alkyl, alkenyl, aryl, alkaryl, and aralkyl; and $R^3$ is a moiety comprising a group that is capable of undergoing a polymerization reaction when exposed to actinic radiation or ionizing radiation.

The present invention is further directed to a method of coating a substrate that includes:
(a) providing a substrate;
(b) applying a layer of a radiation-curable composition that includes the copolymer described above over at least a portion of a surface of the substrate; and
(c) curing the radiation-curable composition by exposing the layer to actinic radiation or ionizing radiation in an amount sufficient to effect curing of the radiation-curable composition. The present invention is also directed to substrates coated using the above-described method.

The present invention is additionally directed to a multi-layer composite coating that includes:
(A) a base coat layer deposited from a base coat composition; and
(B) a top coat deposited over at least a portion of the base coat layer from a top coat composition; where either or both of the base coat and the top coat are deposited from the radiation-curable composition described above. The present invention is also directed to substrates coated with the above-described multi-layer composite coating.

DETAILED DESCRIPTION OF THE INVENTION

Other than in the operating examples or where otherwise indicated, all numbers or expressions referring to quantities of ingredients, reaction conditions, etc., used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "copolymer composition" is meant to include a synthesized copolymer, as well as residues from initiators, catalysts, and other elements attendant to the synthesis of the copolymer, but not covalently incorporated thereto. Such residues and other elements considered as part of the copolymer composition are typically mixed or co-mingled with the copolymer such that they tend to remain with the copolymer when it is transferred between vessels or between solvent or dispersion media.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

The terms "donor monomer" and "acceptor monomer" are used throughout this application. With regard to the present invention, the term "donor monomer" refers to monomers that have a polymerizable, ethylenically unsaturated group that has relatively high electron density in the ethylenic double bond, and the term "acceptor monomer" refers to monomers that have a polymerizable, ethylenically unsaturated group that has relatively low electron density in the ethylenic double bond. This concept has been quantified to an extent by the Alfrey-Price Q-e scheme (Robert Z. Greenley, Polymer Handbook, Fourth Edition, Brandrup, Immergut and Gulke, editors, Wiley & Sons, New York, N.Y., pp. 309–319 (1999)). All e values recited herein are those appearing in the Polymer Handbook unless otherwise indicated.

In the Q-e scheme, Q reflects the reactivity of a monomer and e represents the polarity of a monomer, which indicates the electron density of a given monomer's polymerizable, ethylenically unsaturated group. A positive value for e indicates that a monomer has a relatively low electron density and is an acceptor monomer, as is the case for maleic anhydride, which has an e value of 3.69. A low or negative value for e indicates that a monomer has a relatively high electron density and is a donor monomer, as is the case for vinyl ethyl ether, which has an e value of −1.80.

As referred to herein, a strong acceptor monomer is meant to include those monomers with an e value greater than 2.0. The term "mild acceptor monomer" is meant to include those monomers with an e value greater than 0.5 up to and including those monomers with an e value of 2.0. Conversely, the term "strong donor monomer" is meant to include those monomers with an e value of less than −1.5, and the term "mild donor monomer" is meant to include those monomers with an e value of less than 0.5 to those with an e value of −1.5.

As used herein and in the claims, the term "dual cure" refers to curing a material by subjecting it to ionizing radiation or actinic light and also to conventional curing mechanisms used, for example, to cure a thermosetting resin. As a non-limiting example, U.S. Pat. No. 4,025,407 to Chang et al., which is herein incorporated by reference, describes methods for preparing high solids films from a mixture of a radiation sensitive material and a thermosetting resin. The mixture is cured by exposure to ionizing irradiation or actinic light and/or heating.

As used herein and in the claims, the term "actinic radiation" refers to electromagnetic radiation that is capable of initiating a chemical reaction. A non-limiting example of actinic radiation is ultraviolet radiation or ultraviolet light.

As used herein and in the claims, the term "ionizing radiation" refers to radiation that is sufficiently high in energy to cause ionization in a medium through which it passes. Non-limiting examples of ionizing radiation include, but are not limited to, high-energy particle beams, which may be made up of, for example, electrons, protons, or alpha particles, or short-wavelength electromagnetic radiation, such as ultraviolet radiation, gamma rays, or X-rays. In an embodiment of the present invention, the ionizing radiation is supplied by an electron beam.

The present invention is directed to a radiation-curable composition that includes a copolymer composition that contains a copolymer containing one or more groups that are capable of undergoing a polymerization reaction when exposed to actinic radiation or ionizing radiation. The polymerizable groups may be an ethylenically unsaturated group, an epoxy group and/or a thiol. As non-limiting examples, the radiation may be supplied by ultraviolet radiation, ultraviolet light, and/or an electron beam.

The radiation-curable composition typically has good wetting properties and adhesive properties with suitable substrates. Suitable substrates include, but are not limited to, wood, paper, particleboard, chipboard, metals, metals having primers thereon, glass, plastics, and metallized plastics.

The copolymer may have at least 20 mol %, in some situations 30 mol %, in many cases at least 40 mol %, typically at least 50 mol %, in some cases, at least 60 mol %, and in other cases at least 75 mol % of residues of the copolymer derived from alternating sequences of donor monomer—acceptor monomer pairs having the alternating monomer residue units of structure:

-[DM-AM]- where DM represents a residue from a donor monomer and AM represents a residue from an acceptor monomer. The copolymer may be a 100% alternating copolymer of DM and AM. More particularly, the copolymer may include at least 10 mol %, in some cases, 15 mol % of a donor monomer, which is an isobutylene-type monomer, having the following structure (I):

where $R^1$ is linear or branched $C_1$ to $C_4$ alkyl; $R^2$ is one or more of methyl, linear, cyclic, or branched $C_1$ to $C_{20}$ alkyl, alkenyl, aryl, alkaryl, and aralkyl. Further, at least 10 mol % and, in some cases, at least 15 mol % of the copolymer includes an acrylic monomer as an acceptor monomer. The group $R^2$ may include one or more functional groups selected from epoxy, carboxylic acid, hydroxy, thiol, isocyanate, capped isocyanate, amide, amine, aceto acetate, methylol, methylol ether, oxazoline carbamate, and beta-hydroxyalkylamide.

In an embodiment of the present invention, the copolymer includes a substantial portion of alternating residues of a mild donor monomer as described by structure I and a mild acceptor monomer, which is an acrylic monomer. A non-limiting list of published e values for monomers that may be included as monomers described by structure I and acrylic monomers of the present invention are shown in Table 2.

TABLE 2

| Alfrey-Price e values for Selected Monomers | |
|---|---|
| Monomer | e value |
| Monomers of structure 1 | |
| Isobutylene | −1.20[1] |
| Diisobutylene | 0.49[2] |
| Acrylic Monomers | |
| Acrylic Acid | 0.88[1] |
| Acrylamide | 0.54[1] |
| Acrylonitrile | 1.23[1] |
| Methyl Acrylate | 0.64[1] |
| Ethyl Acrylate | 0.55[1] |
| Butyl Acrylate | 0.85[1] |
| Benzyl acrylate | 1.13[1] |
| Glycidyl acrylate | 1.28[1] |

[1]Polymer Handbook, Fourth Edition (1999)
[2]Rzaev et al., Eur. Polym. J., Vol. 24, No. 7, pp. 981–985 (1998)

Any suitable donor monomer may be used in the present invention. Suitable donor monomers that may be used include strong donor monomers and mild donor monomers. The present invention is particularly useful for preparing alternating copolymers where a mild donor molecule is used. The present copolymers will include a mild donor monomer described by structure I, such as isobutylene and diisobutylene, dipentene, 1-octene, and isoprenol, and may additionally include other suitable mild donor monomers. The mild donor monomer of structure I may be present in the copolymer composition at a level of at least 10 mol %, in some situations 15 mol %, in some cases, at least 25 mol %, typically at least 30 mol % and in some cases, at least 35 mol %. The mild donor monomer of structure I is present in the copolymer composition at a level of up to 50 mol %, in some cases, up to 47.5 mol %, typically up to 45 mol %, and, in some cases, up to 40 mol %. The level of the mild donor monomer of structure I used is determined by the properties that are to be incorporated into the copolymer composition. Residues from the mild donor monomer of structure I may be present in the copolymer composition in any range of values inclusive of those stated above.

Suitable other donor monomers that may be used in the present invention include, but are not limited to, ethylene, butene, styrene, substituted styrenes, methyl styrene, substituted styrenes, vinyl ethers, vinyl esters, vinyl pyridines, divinyl benzene, vinyl naphthalene, and divinyl naphthalene. Vinyl esters include vinyl esters of carboxylic acids, which include, but are not limited to, vinyl acetate, vinyl butyrate, vinyl 3,4-dimethoxybenzoate, and vinyl benzoate. The use of other donor monomers is optional, when other donor monomers are present, they are present at a level of at least 0.01 mol % of the copolymer composition, often at least 0.1 mol %, typically at least 1 mol %, and, in some cases, at least 2 mol %. The other donor monomers may be present at up to 25 mol %, in some cases, up to 20 mol %, typically up to 10 mol %, and, in some cases, up to 5 mol %. The level of other donor monomers used is determined by the properties that are to be incorporated into the copolymer composition. Residues from the other donor monomers may be present in the copolymer composition in any range of values inclusive of those stated above.

The copolymer composition includes acceptor monomers as part of the alternating donor monomer—acceptor monomer units along the copolymer chain. Any suitable acceptor monomer may be used. Suitable acceptor monomers include strong acceptor monomers and mild acceptor monomers. A non-limiting class of suitable acceptor monomers are those described by the structure (II):

where W is selected from the group consisting of —CN, —X, and —C(=O)—Y, wherein Y is selected from the group consisting of —NR$^{31}_2$, —O—R$^5$—O—C(=O)—NR$^{31}_2$, and —OR$^4$; R$^{31}$ is selected from the group consisting of H, linear or branched C$_1$ to C$_{20}$ alkyl, and linear or branched C$_1$ to C$_{20}$ alkylol; R$^4$ is selected from the group consisting of H, poly(ethylene oxide), poly(propylene oxide), linear or branched C$_1$ to C$_{20}$ alkyl, alkylol, aryl and aralkyl, linear or branched C$_1$ to C$_{20}$ fluoroalkyl, fluoroaryl and fluoroaralkyl, a siloxane radical, a polysiloxane radical, an alkyl siloxane radical, an ethoxylated trimethylsilyl siloxane radical, and a propoxylated trimethylsilyl siloxane radical; R$^5$ is a divalent linear or branched C$_1$ to C$_{20}$ alkyl linking group; and X is a halide.

A class of mild acceptor monomers that may be included in the present copolymer composition are acrylic acceptor monomers. Suitable acrylic acceptor monomers include those described by structure (III):

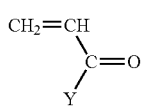

where Y is selected from the group consisting of —NR$^{31}_2$, —O—R$^5$—O—C(=O)—NR$^{31}_2$, and —OR$^4$; R$^{31}$ is selected from the group consisting of H, linear or branched C$_1$ to C$_{20}$ alkyl, and linear or branched C$_1$ to C$_{20}$ alkylol; R$^4$ is selected from the group consisting of H, poly(ethylene oxide), poly(propylene oxide), linear or branched C$_1$ to C$_{20}$ alkyl, alkylol, aryl and aralkyl, linear or branched C$_1$ to C$_{20}$ fluoroalkyl, fluoroaryl and fluoroaralkyl, a siloxane radical, a polysiloxane radical, an alkyl siloxane radical, an ethoxylated trimethylsilyl siloxane radical, and a propoxylated trimethylsilyl siloxane radical; and R$^5$ is a divalent linear or branched C$_1$ to C$_{20}$ alkyl linking group.

A particularly useful type of acrylic acceptor monomers are those described by structure III where Y includes at least one functional group of epoxy, carboxylic acid, hydroxy, thiol, isocyanate, capped isocyanate, amide, amine, aceto acetate, methylol, methylol ether, oxazoline carbamate, and beta-hydroxyalkylamide.

Examples of suitable acceptor monomers include, but are not limited to, hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, perfluoro methyl ethyl acrylate, perfluoro ethyl ethyl acrylate, perfluoro butyl ethyl acrylate, trifluoromethyl benzyl acrylate, perfluoro alkyl ethyl, acryloxyalkyl terminated polydimethylsiloxane, acryloxyalkyl tris(trimethylsiloxy silane), acryloxyalkyl trimethylsiloxy terminated polyethylene oxide, chlorotrifluoro ethylene, glycidyl acrylate, 2-ethylhexyl acrylate, and n-butoxy methyl acrylamide.

The acrylic acceptor monomers of structure III may include residues of glycidyl acrylate, where the epoxy group has been reacted with a suitable active hydrogen compounds that contains an ethylenically unsaturated group as explained below.

The acrylic acceptor monomers of structure III may be present in the copolymer composition at a level of at least 10 mol %, in some situations 15 mol %, in some cases, at least 25 mol %, typically at least 30 mol %, and, in some cases, at least 35 mol %. The acrylic acceptor monomers of structure III are present in the copolymer composition at a level of up to 50 mol %, in some cases, up to 47.5 mol %, typically up to 45 mol %, and, in some cases, up to 40 mol %. The level of the acrylic acceptor monomers of structure III used is determined by the properties that are to be incorporated into the copolymer composition. Residues from the acrylic acceptor monomers of structure III may be present in the copolymer composition in any range of values inclusive of those stated above.

Suitable other mild acceptor monomers that may be used in the present invention include, but are not limited to, acrylonitrile, methacrylonitrile, vinyl halides, crotonic acid, vinyl alkyl sulfonates, and acrolein. Vinyl halides include, but are not limited to, vinyl chloride and vinylidene fluoride. The use of other mild acceptor monomers is optional, when other mild acceptor monomers are present, they are present at a level of at least 0.01 mol % of the copolymer composition, often at least 0.1 mol %, typically at least 1 mol %, and, in some cases, at least 2 mol %. The other acceptor monomers may be present at up to 35 mol %, in some cases, up to 25 mol %, typically up to 15 mol %, and, in some cases, up to 10 mol %. The level of other acceptor monomers used is determined by the properties that are to be incorporated into the copolymer composition. Residues from the other acceptor monomers may be present in the copolymer composition in any range of values inclusive of those stated above.

The present copolymer has a molecular weight of at least 250, in many cases at least 500, typically at least 1,000, and, in some cases, at least 2,000. The present copolymer may have a molecular weight of up to 1,000,000, in many cases up to 500,000, typically up to 100,000, and, in some cases, up to 50,000. Certain applications will require that the molecular weight of the present copolymer not exceed 30,000, in some cases, not exceed 25,000, in other cases not exceed 20,000, and, in certain instances, not exceed 16,000. The molecular weight of the copolymer is selected based on the properties that are to be incorporated into the copolymer composition. The molecular weight of the copolymer may vary in any range of values inclusive of those stated above.

The polydispersity index (PDI) of the present copolymer is not always critical. The polydispersity index of the copolymer is usually less than 4, in many cases less than 3.5, typically less than 3, and, in some cases less than 2.5. As used herein, and in the claims, "polydispersity index" is determined from the following equation: (weight average molecular weight (Mw)/number average molecular weight A particularly preferred embodiment is one where the monomer residues containing the groups $R^1$ and $R^2$ are derived from one or a combination of diisobutylene, isobutylene, dipentene, 1-octene, and isoprenol, and the monomer residues containing the group $R^3$ are derived from one or more acrylic monomers having the structure CH2=CH—C(O)—$R^3$, where $R^3$ is one or more of structures V–XI:

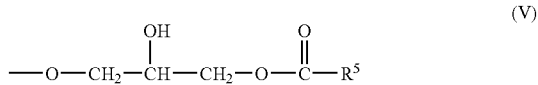

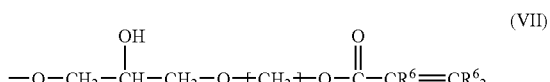

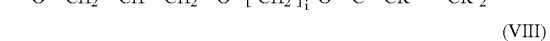

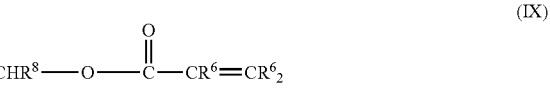

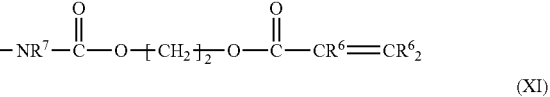

(Mn)). A monodisperse polymer has a PDI of 1.0. Further, as used herein, Mn and Mw are determined from gel permeation chromatography using polystyrene standards.

In the present copolymer composition, the residues of the copolymer derived from alternating sequences of donor monomer—acceptor monomer pairs, -[DM-AM]-, include residues that have the alternating structure IV:

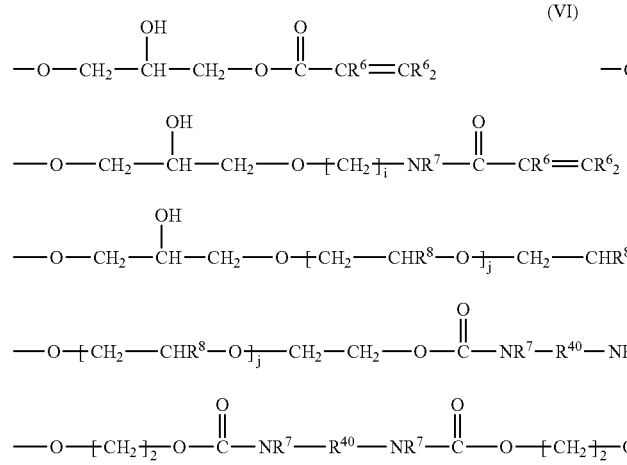

where n is an integer from 1 to 10,000; $R^1$ and $R^2$ are as defined above; and $R^3$ is a moiety containing one or more groups that are capable of undergoing a polymerization reaction when exposed to actinic radiation or ionizing radiation. Non-limiting examples of the polymerizable groups in $R^3$ include ethylenically unsaturated groups, epoxy groups and thiols.

where $R^5$ is selected from $C_6$ to $C_{24}$ alkenyl groups containing from 1 to 4 ethylenically unsaturated groups and $C_3$ to $C_8$ linear or branched alkenyl groups containing at least one ethylenically unsaturated group; each occurrence of $R^6$ is independently selected from hydrogen, linear, cyclic or branched $C_1$ to $C_{20}$ alkyl, alkenyl, aryl, alkaryl, aralkyl, alkylol, aralkylol, alkyl thiol and aralkyl thiol, and —COOR$^9$ where $R^9$ is selected from hydrogen and $C_1$ to $C_4$ alkyl; $R^7$ is selected from H and $C_1$ to $C_4$ alkyl; each occurrence of $R^8$ is independently selected from H and $C_1$ to $C_4$ alkyl; $R^{40}$ is a linking group selected from linear, cyclic or branched $C_2$ to $C_{25}$ alkylene, alkenylene, alkylene aryl, oxyalkylene and polyoxyalkylene; i is from 1 to 10; and j is from 0 to 100. The copolymer compositions of the present invention may also include other polymerizable, ethylenically unsaturated monomers.

As used herein, "alkylene" refers to an acyclic or cyclic, saturated hydrocarbon group having a carbon chain length of from $C_2$ to $C_{25}$. Nonlimiting examples of suitable alkylene groups include, but are not limited to, those derived from propenyl, 1-butenyl, 1-pentenyl, 1-decenyl, and 1-heneicosenyl, such as, for example $(CH_2)_3$, $(CH_2)_4$, $(CH_2)_5$, $(CH_2)_{10}$, and $(CH_2)_{23}$, respectively, as well as isoprene and myrcene.

As used herein, "oxyalkylene" refers to an alkylene group containing at least one oxygen atom bonded to, and interposed between, two carbon atoms and having an alkylene carbon chain length of from $C_2$ to $C_{25}$. Nonlimiting examples of suitable oxyalkylene and polyoxyalkylene groups include those derived from trimethylolpropane monoallyl ether, trimethylolpropane diallyl ether, pentaerythritol monoallyl ether, polyethoxylated allyl alcohol, and polypropoxylated allyl alcohol, such as —($CH_2$)$_3$O$CH_2$C($CH_2$OH)$_2$($CH_2$$CH_2$—).

As used herein, "alkylene aryl" refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substitufor example, 2,4,7,9-tetramethyl-5-decyne-4,7-diol which is commercially available from Air Products and Chemicals, Inc. of Allentown, Pa. as SURFYNOL 104.

In an embodiment of the present invention, $R^{40}$ is or is derived from a mono-, di- or poly-functional $C_2$ to $C_{25}$ aliphatic, cycloaliphatic or aromatic isocyanate. As a non-limiting example, the isocyanate may be isophorone diisocyanate. In such cases, $R^3$ will typically have a mixture of structures that may include one or more of structures XII–XV:

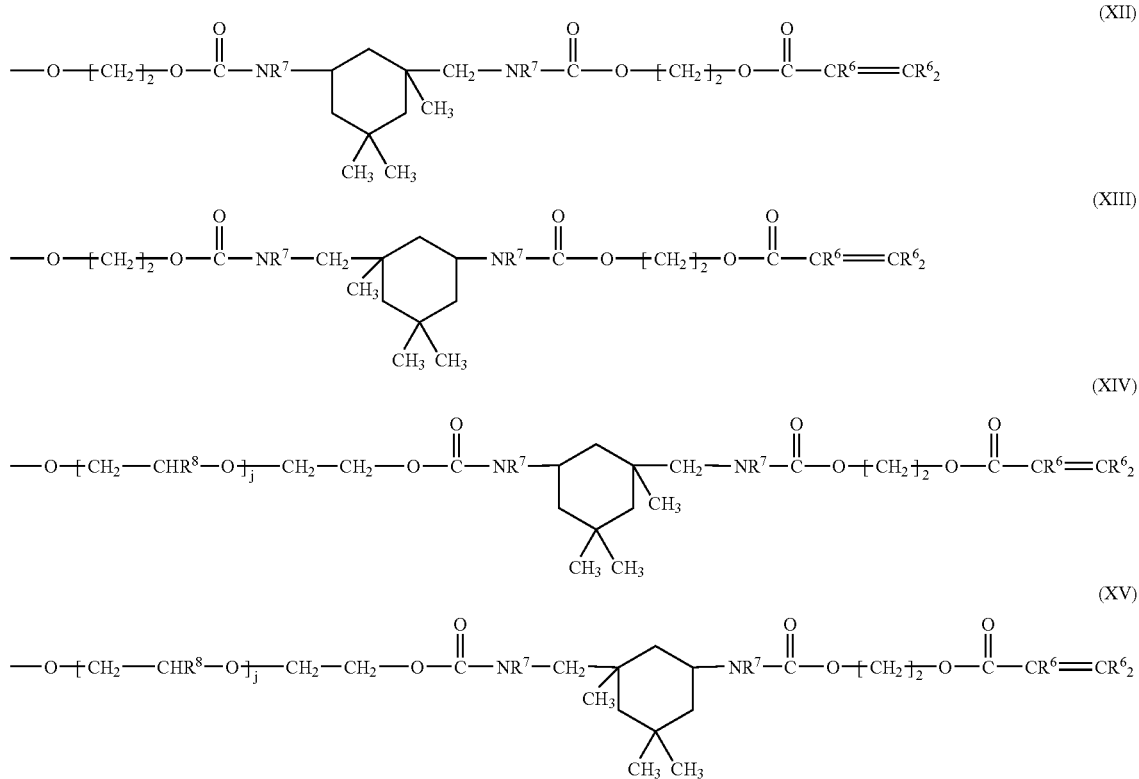

ent groups for the aryl group include, but are not limited to, hydroxyl groups, benzyl groups, carboxylic acid groups, and aliphatic hydrocarbon groups. Nonlimiting examples of suitable alkylene aryl groups include, but are not limited to, those derived from styrene and 3-isopropenyl-α,α-dimethylbenzyl isocyanate, such as —($CH_2$)$_2$$C_6$$H_4$— and —$CH_2$CH($CH_3$)$C_6$$H_3$ (C($CH_3$)$_2$(NCO).

As used herein, "alkenylene" refers to an acyclic or cyclic hydrocarbon group having one or more double bonds and having an alkenylene carbon chain length of $C_2$ to $C_{25}$. Nonlimiting examples of suitable alkenylene groups include those derived from propargyl alcohol and acetylenic diols, where $R^6$ and $R^7$ are as defined above.

The copolymer composition of the present invention may have all of the incorporated monomer residues in an alternating architecture. A non-limiting example of a copolymer segment having 100% alternating architecture of diisobutylene (DIIB) and an acrylic monomer (Ac) is shown by structure XVI: (XVI) -Ac-DIIB-Ac-DIIB-Ac-DIIB-Ac-DIIB-Ac-DIIB-Ac-DIIB-Ac- However, in most instances, the present copolymer will contain alternating segments and random segments as shown by structure XVII, a copolymer of DIIB, Ac and other monomers, M:

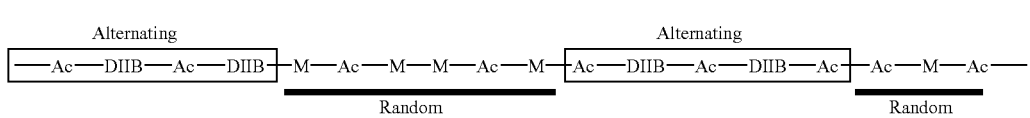

(XVII)

Structure XVII shows an embodiment of the present invention where the copolymer may include alternating segments as shown in the boxes and random segments as shown by the underlined segments.

The random segments of the copolymer may contain donor or acceptor monomer residues that have not been incorporated into the copolymer composition by way of an alternating architecture. The random segments of the copolymer composition may further include residues from other ethylenically unsaturated monomers. As recited herein, all references to polymer segments derived from alternating sequences of donor monomer—acceptor monomer pairs are meant to include segments of monomer residues such as those shown by the boxes in structure XVII.

The other ethylenically unsaturated monomers include any suitable monomer not traditionally categorized as being an acceptor monomer or a donor monomer.

The other ethylenically unsaturated monomer, residue M of structure XVII, is derived from at least one ethylenically unsaturated, radically polymerizable monomer. As used herein and in the claims, "ethylenically unsaturated, radically polymerizable monomer," and like terms, are meant to include vinyl monomers, allylic monomers, olefins, and other ethylenically unsaturated monomers that are radically polymerizable and not classified as donor monomers or acceptor monomers.

Classes of vinyl monomers from which M may be derived include, but are not limited to, monomer residues derived from monomers of the general formula XVIII:

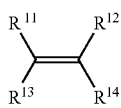

(XVIII)

where $R^{11}$, $R^{12}$, and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl, and phenyl; $R_{13}$ is selected from the group consisting of H, $C_1$–$C_6$ alkyl, $COOR^{15}$, wherein $R^{15}$ is selected from the group consisting of H, an alkali metal, a $C_1$ to $C_6$ alkyl group, glycidyl, and aryl.

Specific examples of other monomers, M, that may be used in the present invention include methacrylic monomers and allylic monomers. Residue of monomer M may be derived from at least one of alkyl methacrylate having from 1 to 20 carbon atoms in the alkyl group. Specific examples of alkyl methacrylates having from 1 to 20 carbon atoms in the alkyl group from which residue M may be derived include, but are not limited to, methyl methacrylate, ethyl methacrylate, propyl methacrylate, isopropyl methacrylate, butyl methacrylate, isobutyl methacrylate, tert-butyl methacrylate, 2-ethylhexyl methacrylate, lauryl methacrylate, isobornyl methacrylate, cyclohexyl methacrylate, and 3,3,5-trimethylcyclohexyl methacrylate, as well as functional methacrylates, such as hydroxyalkyl methacrylates, oxirane functional methacrylates, and carboxylic acid functional methacrylates.

Residue of monomer M may also be selected from monomers having more than one methacrylate group, for example, methacrylic anhydride and diethyleneglycol bis (methacrylate).

As used herein and in the claims, by "allylic monomer(s)" what is meant is monomers containing substituted and/or unsubstituted allylic functionality, i.e., one or more radicals represented by the following general formula XIX, $$H_2C=C(R^{10})-CH_2- \quad (XIX)$$

where $R^{10}$ is hydrogen, halogen, or a $C_1$ to $C_4$ alkyl group. Most commonly, $R^{10}$ is hydrogen or methyl and, consequently, general formula XIX represents the unsubstituted (meth)allyl radical, which encompasses both allyl and methallyl radicals. Examples of allylic monomers include, but are not limited to, (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate, and (meth)allyl benzoate.

In an embodiment of the present invention, a copolymer containing epoxy groups is prepared and the epoxy groups are subsequently reacted with suitable active hydrogen compounds that contain an ethylenically unsaturated group. Any suitable active hydrogen-containing group may be used in the present invention. Suitable active hydrogen containing groups include, but are not limited to, carboxylic acids, amides, alcohols, and amines.

In a particular embodiment of the present invention, glycidyl acrylate is at least one source of epoxy-functional groups in the copolymer. However, it will not always be desirable, or in some cases, it may not be possible to react all of the epoxy groups with a suitable active hydrogen compound that contains an ethylenically unsaturated group. In such a situation the copolymer will contain at least 0.1 mol %, in some case at least 0.5 mol % and in other cases at least 1 mol % and up to 45 mol %, in some cases up to 35 mol %, in other cases up to 30 mol %, in some situations up to 25 mol % and in other situations up to 20 mol % of residues having structural unit XX:

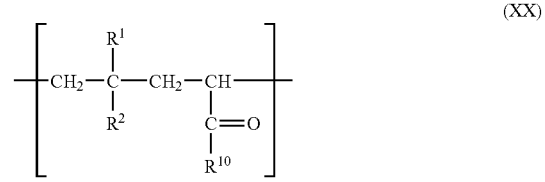

(XX)

where $R^{10}$ includes a group having structure XXI:

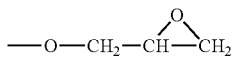 (XXI)

The residues having structural unit XX may be present in the copolymer in any range of values inclusive of those stated above.

The present copolymer composition is prepared by a method including the steps of (a) providing a donor monomer composition comprising one or more donor monomers of structure I; (b) mixing an ethylenically unsaturated monomer composition comprising one or more acceptor monomers with (a) to form a total monomer composition; and (c) polymerizing the total monomer composition in the presence of a free radical initiator. In an embodiment of the present invention, the ethylenically unsaturated monomer composition includes monomers of structure III.

In an embodiment of the present method, the monomer of structure I is present at a molar excess based on the amount of acrylic acceptor monomer. Any amount of excess monomer of structure I may be used in the present invention in order to encourage the formation of the desired alternating architecture. The excess amount of monomer of structure I may be at least 10 mol %, in some cases, up to 25 mol %, typically up to 50 mol %, and, in some cases, up to 100 mol % based on the amount of acrylic acceptor monomer. When the molar excess of monomer of structure I is too high, the process may not be economical on a commercial scale.

In a further embodiment of the present method, the acrylic acceptor monomer is present in an amount of at least 15 mol %, in some cases, 17.5 mol %, typically at least 20 mol %, and, in some cases, 25 mol % of the total monomer composition. The acrylic acceptor monomer may further be present in an amount up to 50 mol %, in some cases, up to 47.5 mol %, typically up to 45 mol %, and, in some cases, up to 40 mol % of the total monomer composition. The level of the acrylic acceptor monomers used is determined by the properties that are to be incorporated into the copolymer composition. The acrylic acceptor monomers may be present in the monomer composition in any range of values inclusive of those stated above.

The ethylenically unsaturated monomer composition of the present method may include other donor monomers as described above, as well as other monomers designated by M and described above. The use of other mild acceptor monomers is optional in the present method. When other mild acceptor monomers are present, they are present at a level of at least 0.01 mol % of the copolymer composition, often at least 0.1 mol %, typically at least 1 mol %, and, in some cases, at least 2 mol % of the total monomer composition. The other acceptor monomers may be present at up to 35 mol %, in some cases, up to 25 mol %, typically up to 15 mol %, and, in some cases, up to 10 mol % of the total monomer composition. The level of other acceptor monomers used herein is determined by the properties that are to be incorporated into the copolymer composition. Residues from the other acceptor monomers may be present in the copolymer composition in any range of values inclusive of those stated above.

The use of other monomers, M, is optional in the present method. When other monomers are present, they are present at a level of at least 0.01 mol % of the copolymer composition, often at least 0.1 mol %, typically at least 1 mol %, and, in some cases, at least 2 mol %. The other monomers may be present at up to 35 mol %, in some cases, up to 25 mol %, typically up to 15 mol %, and, in some cases, up to 10 mol %. The level of other monomers used herein is determined by the properties that are to be incorporated into the copolymer composition. Residues from the other monomers, M, may be present in the copolymer composition in any range of values inclusive of those stated above.

In an embodiment of the present method, an excess of monomer of structure I is used and the unreacted monomer of structure I is removed from the resulting copolymer composition by evaporation. The removal of unreacted monomer is typically facilitated by the application of a vacuum to the reaction vessel.

Any suitable free radical initiator may be used in the present invention. Examples of suitable free radical initiators include, but are not limited to, thermal free radical initiators, photo-initiators, and redox initiators. Examples of suitable thermal free radical initiators include, but are not limited to, peroxide compounds, azo compounds, and persulfate compounds.

Examples of suitable peroxide compound initiators include, but are not limited to, hydrogen peroxide, methyl ethyl ketone peroxides, benzoyl peroxides, di-t-butyl peroxide, di-t-amyl peroxide, dicumyl peroxide, diacyl peroxides, decanoyl peroxides, lauroyl peroxides, peroxydicarbonates, peroxyesters, dialkyl peroxides, hydroperoxides, peroxyketals, and mixtures thereof.

Examples of suitable azo compounds include, but are not limited to, 4-4'-azobis(4-cyanovaleric acid), 1-1'-azobiscyclohexanecarbonitrile), 2-2'-azobisisobutyronitrile, 2-2'-azobis(2-methylpropionamidine)dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride, and 2-(carbamoylazo)-isobutyronitrile.

In an embodiment of the present invention, the ethylenically unsaturated monomer composition and the free radical polymerization initiator are separately and simultaneously added to and mixed with the donor monomer composition. The ethylenically unsaturated monomer composition and the free radical polymerization initiator may be added to the donor monomer composition over a period of at least 15 minutes, in some cases, at least 20 minutes, typically at least 30 minutes, and, in some cases, at least 1 hour. The ethylenically unsaturated monomer composition and the free radical polymerization initiator may further be added to the donor monomer composition over a period of up to 24 hours, in some case up to 18 hours, typically up to 12 hours, and, in some cases, up to 8 hours. The time for adding the ethylenically unsaturated monomer must be sufficient to maintain a suitable excess of donor monomer of structure I over unreacted acrylic acceptor monomer to encourage the formation of donor monomer—acceptor monomer alternating segments. The addition time is not so long as to render the process economically unfeasible on a commercial scale. The addition time may vary in any range of values inclusive of those stated above.

After mixing, or during addition and mixing, polymerization of the monomers takes place. The present polymerization method can be run at any suitable temperature. Suitable temperature for the present method may be ambient, at least 50° C., in many cases at least 60° C., typically at least 75° C., and, in some cases, at least 100° C. Suitable temperature for the present method may further be described as being up to 300° C., in many cases up to 275° C., typically up to 250° C., and, in some cases, up to 225° C. The temperature is typically high enough to encourage good reactivity from the monomers and initiators employed. However, the volatility of the monomers and corresponding partial pressures create a practical upper limit on temperature determined by the pressure rating of the reaction vessel. The polymerization temperature may vary in any range of values inclusive of those stated above.

The present polymerization method can be run at any suitable pressure. A suitable pressure for the present method may be ambient, at least 1 psi, in many cases at least 5 psi, typically at least 15 psi, and, in some cases, at least 20 psi. Suitable pressures for the present method may further be described as being up to 200 psi, in many cases up to 175 psi, typically up to 150 psi, and, in some cases, up to 125 psi. The pressure is typically high enough to maintain the monomers and initiators in a liquid phase. The pressures employed have a practical upper limit based on the pressure rating of the reaction vessel employed. The pressure during polymerization temperature may vary in any range of values inclusive of those stated above.

The copolymer that results from the present method may be utilized as a starting material for the preparation of other polymers by using functional group transformations by methods known in the art. Functional groups that can be introduced by these methods are epoxy, carboxylic acid, hydroxy, thiol, isocyanate, capped isocyanate, amide, amine, aceto acetate, methylol, methylol ether, oxazoline carbamate, and beta-hydroxyalkylamide.

For example, a copolymer of the present method comprising methyl acrylate will contain carbomethoxy groups. The carbomethoxy groups can be hydrolyzed to carboxyl groups or transesterified with an alcohol to form the corresponding ester of the alcohol. Using ammonia, the aforementioned methyl acrylate copolymer can be converted to an amide, or, using a primary or secondary amine, can be converted to the corresponding N-substituted amide. Similarly, using a diamine such as ethylene diamine, one can convert the aforementioned copolymer of the present method to an N-aminoethylamide, or, with ethanolamine, to an N-hydroxyethylamide. The N-aminoethylamide functionality can be further converted to an oxazoline by dehydration. The N-aminoethylamide can be further reacted with a carbonate such as propylene carbonate to produce the corresponding urethane functional copolymer. These transformations can be carried out to convert all of the carbomethoxy groups or can be carried out in part, leaving some of the carbomethoxy groups intact.

Epoxy groups can be introduced into the copolymer of the present method directly by using glycidyl acrylate in the copolymer preparation or indirectly by functional group transformation. One example of an indirect method is to oxidize residual unsaturation in the copolymer to epoxy groups using a peracid such as peroxyacetic acid. Alternatively, one can prepare a carboxyl-functional copolymer by hydrolysis as described above, treat the carboxyl-functional copolymer with epichlorohydrin then alkali to produce the epoxy-functional copolymer. These transformations can also be carried out exhaustively or in part. The resulting epoxy-functional copolymer can be further reacted with the appropriate active hydrogen-containing reagents to form alcohols, amines, or sulfides.

Hydroxyl groups can be introduced directly using a hydroxyl-functional monomer such as hydroxyethyl acrylate in the copolymer of the present method, or they can be introduced by functional group transformation. By treating the carboxyl-functional copolymer described above with an epoxy, one can produce a hydroxyl functional polymer. Suitable epoxies include, but are not limited to, ethylene oxide, propylene oxide, butylene oxide, and glycidyl neodecanoate.

The above-described hydroxyl functional copolymers can be further reacted to form other copolymers. For example, a copolymer containing hydroxyethyl groups can be treated with a carbamylating agent, such as methyl carbamate, to produce the corresponding carbamate functional copolymer. With diketene or t-butyl acetoacetate, the hydroxyl groups can also be converted to acetoacetate esters.

Isocyanate-functional copolymers can also be produced. Copolymers of the present method, which contain 2 or more hydroxyl groups, can be treated with a diisocyanate, such as isophoronediisocyanate, to produce isocyanate-functional polymers. Primary amine functional copolymers, described above, can be phosgenated to produce isocyanate functionality.

As was mentioned above, the copolymer may include epoxy groups, which may be reacted with an active hydrogen compound that contains an ethylenically unsaturated group in order to introduce an ethylenically unsaturated group into the copolymer. In an embodiment of the present invention, the copolymer includes residues from one or more epoxy containing monomers selected from glycidyl acrylate, glycidyl methacrylate, and allyl glycidyl ether.

In a further embodiment of the present invention, the active hydrogen compound that contains an ethylenically unsaturated group is a carboxylic acid described by one of the structures XXII or XXIII:

where $R^5$ is selected from $C_6$ to $C_{24}$ alkenyl groups containing from 1 to 4 ethylenically unsaturated groups and $C_3$ to $C_8$ linear or branched alkenyl groups containing at least one ethylenically unsaturated group, and each occurrence of $R^6$ is independently selected from hydrogen, linear, cyclic or branched $C_1$ to $C_{20}$ alkyl, alkenyl, aryl, alkaryl, aralkyl, alkylol, aralkylol, alkyl thiol and aralkyl thiol, and —COOR$^9$, where $R^9$ is selected from hydrogen and $C_1$ to $C_4$ alkyl. Suitable carboxylic acids that may be used include, but are not limited to, acrylic acid; methacrylic acid; maleic acid and its mono alkyl esters; itaconic acid and its mono alkyl esters; fumaric acid and its mono alkyl esters; aconitic acid and its mono and di alkyl esters; pentenoic acid; oleic acid; linoleic acid; linolenic acid; and linseed oil.

An embodiment of the present invention is directed to a radiation-curable composition that includes the present copolymer containing one or more ethylenically unsaturated groups. The copolymer may be a non-gelled copolymer containing residues of structure IV, which includes a group that is capable of undergoing a polymerization reaction when exposed to actinic radiation or ionizing radiation. The radiation may be provided by ultraviolet radiation, ultraviolet light, or an electron beam.

The present radiation-curable composition may further include at least one photosensitizer or photoinitiator readily known to those skilled in the art. Suitable photosensitizers that may be used in the present invention include, but are not limited to, benzophenone, anthraquinone and thioxanthone. Suitable photoinitiators that may be used in the present invention include, but are not limited to, isobutyl benzoin ether, butyl isomers of butyl benzoin ether, α,α-diethoxyacetophenone, phosphine oxide, and α,α-dimethoxy-α-phenylacetophenone. The radiation-curable composition may further include a thermal polymerization inhibitor.

In an embodiment of the present radiation-curable composition, the composition may contain co-reactive functional groups. In such a case, the composition may be a thermosetting composition.

When the radiation-curable composition includes co-reactive functional groups, the composition may include the above-described copolymer containing one or more groups that are capable of undergoing a polymerization reaction when exposed to actinic radiation or ionizing radiation, such as an ethylenically unsaturated group and reactive functional groups, and at least one other component that contains reactive functional groups that are reactive with the functional groups of the copolymer and/or one or more groups that are capable of undergoing a polymerization reaction when exposed to actinic radiation or ionizing radiation. In this embodiment, the radiation-curable composition will typically be able to be cured by actinic or ionizing radiation, as well as by a second curing step, which may include thermal curing, air curing, oxidative curing, cationic UV curing, and moisture curing.

As used herein and in the claims, the term "thermal curing" and similar and related terms refers to polymerization and/or crosslinking reactions that are initiated by exposing the radiation-curable composition to infrared radiation and/or temperatures that exceed ambient temperatures.

As used herein and in the claims, the term "oxidative curing" and similar and related terms refers to polymerization and/or crosslinking reactions that take place via an oxidative mechanism, either at an ethylenically unsaturated site in a polymer and/or in a functional group.

When oxidative curing methods are used, the curing reaction may take place at temperatures ranging from ambient to above 160° C. Additionally, metal driers, in the form of polyvalent metal salts or complexes of organic acids, and known in the art, are useful to accelerate the oxidative cure of the radiation-curable composition. Cobalt or manganese naphthenates or octoates are non-limiting examples of driers serving this function. Other auxiliary driers may also be used in combination with cobalt or manganese to promote faster hardness development and water resistance. Non-limiting examples include metal salts of calcium, zirconium, potassium, iron, zinc, copper, or lead. Drier accelerators such as 1,10 phenanthroline may also be used along with the metal driers to improve dry performance.

As used herein and in the claims, the term "cationic UV curing" and similar and related terms refers to polymerization and/or crosslinking reactions that are initiated by cationic UV cure initiators when exposed to appropriate UV radiation as described below. The radiation-curable composition may include suitable radiation cure functional groups capable of reacting with suitable cationic UV cure initiators. A non-limiting description of suitable radiation cure functional groups and mechanisms are described in Davidson, *Exploring the Science, Technology and Applications of U.V. and E.B. Curing*, published by SITA Technology Limited, London, UK (1999). Suitable cationic UV cure initiators include, but are not limited to, triaryl sulfonium salts, triaryl iodonium salts, and triphenyl sulfonium hexafluorosulfate.

As used herein and in the claims, the term "moisture curing" and similar and related terms refers to polymerization and/or crosslinking reactions that are initiated by exposing the radiation-curable composition to atmospheric moisture. Functional groups that may be included in the radiation-curable composition and conditions to effect moisture curing are generally known in the art and disclosed by, for example, U.S. Pat. No. 6,414,077 to Barron et al., U.S. Pat. No. 4,043,953 to Chang et al., U.S. Pat. No. 4,707,515 to Gilch et al, U.S. Pat. No. 4,147,685 to Smith, U.S. Pat. No. 4,177,301 to Smith, and U.S. Pat. No. 4,910,255 to Wakabayashi.

In a particular embodiment of the present invention, the radiation-curable composition is a liquid.

As was mentioned, the present radiation-curable composition may be cured by exposure to ionizing radiation and/or ultraviolet light. The radiation-curable compositions of the invention are especially useful as radiation-curable coating compositions. They can be applied to a variety of substrates, examples of which include wood, paper, particleboard, chipboard, metals, metals having primers thereon, glass, plastics, and metallized plastics. The radiation-curable compositions may be applied by any known means, non-limiting examples of which include brushing, dipping, roll coating, doctor blade coating, spraying, curtain coating, etc. They may be preliminarily dried to remove solvent if desired and then cured by actinic radiation.

An embodiment of the present invention is directed to a method of coating a substrate that includes:

(a) providing a substrate;

(b) applying a layer of the present radiation-curable composition over at least a portion of a surface of the substrate; and (c) curing the radiation-curable composition by exposing the layer to actinic radiation or ionizing radiation in an amount sufficient to effect curing of the radiation-curable composition.

When the actinic radiation is ultraviolet radiation, it may be provided from any suitable source which emits ultraviolet light having a wavelength ranging from about 180 to about 400 nanometers, and may be employed to cure a composition of the invention. Suitable sources of ultraviolet light are generally known and include, for example, mercury arcs, carbon arcs, low pressure mercury lamps, medium pressure mercury lamps, high pressure mercury lamps, swirl-flow plasma arcs, and ultraviolet light emitting diodes. Preferred are ultraviolet light emitting lamps of the medium pressure mercury vapor type. Such lamps usually have fused quartz envelopes and are ordinarily in the form of long tubes having an electrode at both ends. Typically, preferred medium pressure mercury lamps usually employed to cure a composition of the invention have outputs of about 200 watts per inch across the length of the tube. Another advantage of compositions of the invention is their excellent degree of cure in air at relatively low energy exposure in ultraviolet light.

In an embodiment of the present invention, the present composition may be cured using radiation in air or in an inert atmosphere. Typically, ultraviolet radiation cure may be accomplished in air or in nitrogen. In a further embodiment, electron beam radiation cure is carried out in an inert atmosphere, such as nitrogen, to cure the surface, as any oxygen present may compete with the cure reaction.

Generally, a 1 mil thick wet film of a composition of the invention, provided it further comprises a photocuring promoter such as a photoinitiator and/or a photosensitizer, can be cured in air through its thickness to a tack-free state upon exposure to ultraviolet light by passing the film at a rate of 20 feet per minute or more under four or fewer medium pressure mercury vapor lamps operating at 200 watts per inch at a distance of 4 inches from the surface of the wet film. Photoinitiators and photosensitizers for use in ultraviolet light curable compositions are generally known in the art of UV curable compositions. Examples of photosensitizers include benzophenone, anthraquinone, and thioxanthone. Examples of photoinitiators include isobutyl benzoin ether, mixtures of butyl isomers of butyl benzoin ether, alpha, alpha-diethoxyacetophenone, and alpha, alpha-dimethoxy-alpha-phenylacetophenone. Other examples of photoinitiators and photosensitizers can be found in U.S. Pat. No. 4,017,652.

Although in many cases the present compositions may be cured using UV radiation, where desired, they may be thermally cured, oxidatively cured, catatonically UV cured, or moisture cured.

When the compositions are thermally cured, they are typically cured in the presence of a thermal free radical initiator. Non-limiting examples of thermal initiators include the generally known thermal initiators for curing ethylenically unsaturated monomers, including, but not limited to, peroxides such as benzoyl peroxide, methyl ethyl ketone peroxide, cumene hydroperoxide, cyclohexanone peroxide, 2,4-dichlorobenzoyl peroxide, bis(p-bromobenzoyl) peroxide, and acetyl peroxide.

Where desired, a thermal polymerization inhibitor may be utilized in a composition of the invention. Examples of thermal polymerization inhibitors include the methyl ester of hydroquinone, phenolic compounds such as di-tertiary-butyl paracresol, and compounds containing secondary or tertiary nitrogen atoms.

The radiation-curable composition of the present invention may also contain a solvent such as conventional aliphatic and aromatic solvents or diluents known in the art.

Where desired, the radiation-curable composition of the invention may also contain pigment. When it is desired to cure the composition with ultraviolet light, the pigment utilized is typically an ultraviolet light transparent pigment. The phrase "ultraviolet light transparent" is used to mean that the pigment does not substantially interfere with UV curing of the composition. Examples of ultraviolet light transparent pigments include talc, calcium carbonate, aluminum silicate, magnesium silicate, barytes, and silica ($SiO_2$). Coloring pigments generally employed to impart color in non-UV cured coating compositions typically absorb or block ultraviolet light, thereby interfering with UV curing of the composition. Accordingly, where some degree of color tinting of the composition is desired, such conventional coloring pigments typically are employed in only limited amounts when cure is to be effected utilizing UV.

When the radiation-curable composition includes a copolymer containing both a group that is capable of undergoing a polymerization reaction when exposed to actinic radiation or ionizing radiation, such as an ethylenically unsaturated group, and reactive functional groups, the radiation-curable composition is capable of undergoing dual cure. Such dual cure compositions contain more than one type of polymerizable group. As a non-limiting example, such compositions may contain ethylenically unsaturated and epoxy groups.

During exposure to radiation, the degree of crosslinking of the radiation sensitive groups is usually substantially complete. As a non-limiting example, during exposure to heat, the degree of crosslinking of the thermosetting functional groups is usually substantially complete. The exposures to radiation and heat can be conducted in any suitable order, i.e., radiation first, heat second; heat first, radiation second; or successive exposures such heat followed by radiation followed by heat. When considered from the standpoint of the copolymer as a whole, it may be said that the copolymer is partially cured during a first exposure and completely cured after the one or more subsequent exposures.

In an embodiment of the present invention, the radiation-curable composition may also act as a thermosetting composition. In such an embodiment, the radiation-curable composition includes the ungelled copolymer composition, where the copolymer contains one or more reactive functional groups, as well as ethylenically unsaturated groups, and the composition may further include a crosslinking agent having at least two functional groups that are reactive with the functional groups of the copolymer and/or a group that is capable of undergoing a polymerization reaction when exposed to actinic radiation or ionizing radiation.

The functional groups in the copolymer may be any suitable functional groups. Suitable functional groups include, but are not limited to, epoxy, carboxylic acid, hydroxy, thiol, isocyanate, capped isocyanate, amide, amine, aceto acetate, methylol, methylol ether, oxazoline carbamate, and beta-hydroxyalkylamide. The crosslinking agent will have suitable functional groups that will react with the functional groups in the copolymer. Suitable functional groups for the crosslinking agent include, but are not limited to, epoxy, carboxylic acid, hydroxy, thiol, amide, amine, oxazoline, aceto acetate, methylol, methylol ether, isocyanate, capped isocyanate, beta hydroxyalkamide, and carbamate.

The copolymer containing reactive functional groups will typically have a functional equivalent weight of from 100 to 5,000 grams/equivalent. The equivalent ratio of functional groups of the crosslinking agent to functional equivalents in the functional copolymer is typically within the range of 1:3 to 3:1. When a crosslinking agent is present in the radiation-curable composition, it is present in an amount of from 1 to 45 percent by weight based on total weight of resin solids, and the functional copolymer is present in an amount of from 55 to 99 percent by weight based on total weight of resin solids.

A non-limiting example of the present radiation-curable composition is one where the functional group of the copolymer is hydroxy and the functional group of the crosslinking agent is a capped polyisocyanate, where the capping group of the capped polyisocyanate crosslinking agent is one or more of hydroxy functional compounds, 1H-azoles, lactams, ketoximes, and mixtures thereof. The capping group may be phenol, p-hydroxy methylbenzoate, 1H-1,2,4-triazole, 1H-2,5-dimethyl pyrazole, 2-propanone oxime, 2-butanone oxime, cyclohexanone oxime, e-caprolactam, or mixtures thereof. The polyisocyanate of the capped polyisocyanate crosslinking agent is one or more of 1,6-hexamethylene diisocyanate, cyclohexane diisocyanate, α,α'-xylylene diisocyanate, α,α,α',α'-tetramethylxylylene diisocyanate, 1-isocyanato-3,3,5-trimethyl-5-isocyanatomethylcyclohexane, diisocyanato-dicyclohexylmethane, dimers of the polyisocyanates, or trimers of the polyisocyanates.

When the copolymer has hydroxy functionality, it will typically have a hydroxy equivalent weight of from 100 to 10,000 grams/equivalent. The equivalent ratio of isocyanate equivalents in the capped polyisocyanate crosslinking agent to hydroxy equivalents in the hydroxy functional copolymer is typically within the range of 1:3 to 3:1. In this embodiment, the capped polyisocyanate crosslinking agent is present in the liquid thermosetting composition in an amount of from 1 to 45 percent by weight based on total weight of resin solids, and the hydroxy functional copolymer is present in an amount of from 55 to 99 percent by weight based on total weight of resin solids.

Another non-limiting example of the present radiation-curable composition is one where the copolymer has epoxy-functional groups and the crosslinking agent is a carboxylic acid functional compound having from 4 to 20 carbon atoms. The carboxylic acid crosslinking agent may be one or more of dodecanedioic acid, azelaic acid, adipic acid, 1,6-hexanedioic acid, succinic acid, pimelic acid, sebacic acid, maleic acid, citric acid, itaconic acid, or aconitic acid.

A further non-limiting example of the present radiation-curable composition also acting as a thermosetting composition is one where the copolymer has carboxylic acid functional groups and the crosslinking agent is a beta-hydroxyalkylamide compound. The liquid thermosetting composition may further include a second polycarboxylic acid functional material selected from the group consisting of $C_4$ to $C_{20}$ aliphatic carboxylic acids, polymeric polyanhydrides, polyesters, polyurethanes, and mixtures thereof. The beta-hydroxyalkylamide may be represented by the following structure XXIV:

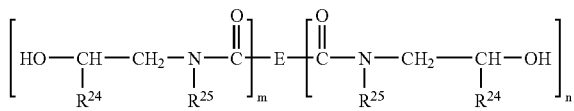

[XXIV]

where $R^{24}$ is H or $C_1$–$C_5$ alkyl; $R^{25}$ is H, $C_1$–$C_5$ or a group having alkyl structure XXV:

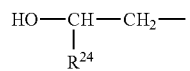

(XXV)

for which $R^{24}$ is as described above; E is a chemical bond or monovalent or polyvalent organic radical derived from saturated, unsaturated, or aromatic hydrocarbon radicals including substituted hydrocarbon radicals containing from 2 to 20 carbon atoms; m is 1 or 2, n is from 0 to 2; and m+n is at least 2.

The radiation-curable composition of the present invention may be used as a film-forming (coating) composition and may contain adjunct ingredients conventionally used in such compositions. Optional ingredients such as, for example, pigments, plasticizers, surfactants, thixotropic agents, anti-gassing agents, organic cosolvents, flow controllers, anti-oxidants, and similar additives conventional in the art may be included in the composition. These ingredients are typically present at up to about 40% by weight based on the total weight of resin solids.

The radiation-curable composition of the present invention may be waterborne, but is usually solventborne. Suitable solvent carriers include the various esters, ethers, and aromatic solvents, including mixtures thereof, that are known in the art of coating formulation. The composition typically has a total solids content of about 5 to 100 percent by weight, in some cases, about 40 to about 80 percent by weight. The radiation-curable composition of the present invention will often have a VOC content of less than 4 percent by weight, typically less than 3.5 percent by weight and many times less than 3 percent by weight.

When the radiation-curable composition includes one or more groups that are capable of undergoing a polymerization reaction when exposed to actinic radiation or ionizing radiation, such as ethylenically unsaturated groups and reactive functional groups, the composition is capable of dual cure. As such, the present invention is also directed to a method of coating and dual curing a substrate, which includes the steps of:

(a) providing a substrate;

(b) applying a layer of the present radiation-curable composition containing ethylenically unsaturated groups and reactive functional over at least a portion of a surface of the substrate;

(c) curing the radiation-curable composition by exposing the layer to actinic radiation or ionizing radiation in an amount sufficient to effect curing of the radiation-curable composition; and (d) curing the radiation-curable composition by a secondary method. Steps (c) and (d) may be conducted in any order and repeated in any order.

Any suitable secondary method of curing the radiation-curable composition may be used. Suitable secondary methods include, but are not limited to, thermal curing, air curing, oxidative curing, cationic UV curing, and moisture curing.

The radiation-curable composition is typically allowed to coalesce to form a substantially continuous film on the substrate. Typically, the film thickness will be about 0.01 to about 5 mils (about 0.254 to about 127 microns) and in some cases, about 0.1 to about 2 mils (about 2.54 to about 50.8 microns) in thickness. The film is formed on the surface of the substrate by driving solvent, i.e., organic solvent and/or water, out of the film by heating or by an air-drying period. Preferably, the heating will only be for a short period of time, sufficient to ensure that any subsequently applied coatings can be applied to the film without dissolving the composition. Suitable drying conditions will depend on the particular composition but, in general, a drying time of from about 1 to 5 minutes at a temperature of about 68–250° F. (20–121° C.) will be adequate. More than one coat of the composition may be applied to develop the optimum appearance. Between coats, the previously applied coat may be flashed, that is, exposed to ambient conditions for about 1 to 20 minutes. Radiation curing may be performed as explained above.

When thermal curing is used as the secondary curing method, the coalesced radiation-curable composition is next cured by the application of heat. As used herein and in the claims, by "cured" is meant a three-dimensional crosslink network formed by covalent bond formation, e.g., between the free isocyanate groups of the crosslinking agent and the hydroxy groups of the polymer. The temperature at which the radiation-curable composition of the present invention cures is variable, and depends in part on the type and amount of catalyst used. Typically, the thermosetting composition has a cure temperature within the range of 130° C. to 160° C., e.g., from 140° C. to 150° C.

In accordance with the present invention, there is further provided a multi-component composite coating composition that includes a base coat deposited from a film-forming composition; and a top coat deposited over at least a portion of the base coat. The base coat may optionally be pigmented. In many cases the top coat will be substantially pigment free, but it may also be pigmented. Either the base coat or the top coat or both coats may include the radiation-curable composition described above.

The film-forming composition from which the base coat is deposited can be any of the compositions useful in coatings applications, particularly automotive applications in which color-plus-clear coating compositions are extensively used. Pigmented film-forming compositions conventionally comprise a resinous binder and a pigment to act as a colorant. Particularly useful resinous binders are acrylic polymers, polyesters including alkyds, polyurethanes, and the copolymer composition of the present invention.

The resinous binders for the film-forming base coat composition can be organic solvent-based materials, such as those described in U.S. Pat. No. 4,220,679, note column 2, line 24 through column 4, line 40. Also, water-based coating compositions, such as those described in U.S. Pat. Nos. 4,403,003, 4,147,679, and 5,071,904, can be used as the binder in the pigmented film-forming composition.

The film-forming base coat composition may be colored and may also contain metallic pigments. Examples of suitable pigments can be found in U.S. Pat. Nos. 4,220,679, 4,403,003, 4,147,679, and 5,071,904.

Ingredients that may be optionally present in the film-forming base coat composition are those which are well known in the art of formulating surface coatings and include surfactants, flow control agents, thixotropic agents, fillers, anti-gassing agents, organic co-solvents, catalysts, and other customary auxiliaries. Examples of these optional materials and suitable amounts are described in the aforementioned U.S. Pat. Nos. 4,220,679, 4,403,003, 4,147,679, and 5,071,904.

The film-forming base coat composition can be applied to the substrate by any of the conventional coating techniques, such as roll coating, curtain coating, doctor blade coating, spray coating, brushing, dipping, air knife, slotting, screen printing, or flowing, but are most often applied by spraying. The usual spray techniques and equipment for air spraying, airless spraying, and electrostatic spraying employing either manual or automatic methods can be used. The film-forming composition is applied in an amount sufficient to provide a base coat having a film thickness typically of 0.1 to 5 mils (2.5 to 125 microns) and preferably 0.1 to 2 mils (2.5 to 50 microns).

After deposition of the film-forming base coat composition onto the substrate, and prior to application of the top coat, the base coat can be cured or alternatively dried. In drying the deposited base coat, organic solvent and/or water is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes and at a temperature of 21° C. to 93° C.

The top coat is applied over the deposited base coat by any of the methods by which coatings are known to be applied. When the top coat is applied over a deposited base coat that has been dried, the two coatings can be co-cured to form the multi-component composite coating composition of the present invention. Both the base coat and top coat are heated together to conjointly cure the two layers. Typically, curing conditions of 130° C. to 160° C. for a period of 20 to 30 minutes are employed. The top coat typically has a thickness within the range of 0.5 to 6 mils (13 to 150 microns), e.g., from 1 to 3 mils (25 to 75 microns).

The present invention is more particularly described in the following examples, which are intended to be illustrative only, since numerous modifications and variations therein will be apparent to those skilled in the art. Unless otherwise specified, all parts and percentages are by weight.

EXAMPLES 1–3

UV curable resins were prepared using the ingredients enumerated in the table below.

| | Material | Example 1 | Example 2 | Example 3 |
|---|---|---|---|---|
| Charge #1 | Isopropanol | 600 g | 600 g | 600 g |
| Charge #2 | Di-t-amyl peroxide | 90 g | 90 g | 90 g |
| Charge #3 | Isobutylene | 750 g | | |
| | Diisobutylene | | 1000 g | |
| | 1-octene | | | 750 g |
| Charge #4 | Glycidyl Methacrylate | 900 g | 900 g | 900 g |
| | Methyl Acrylate | 750 g | 750 g | 750 g |
| | Butyl Acrylate | 600 g | 750 g | 600 g |
| % Solids | | 80 Wt. % | 65 wt. % | 75 wt. % |
| GPC | Mw | 2814 | 1940 | 2459 |
| | Mn | 1249 | 971 | 1155 |
| | Mw/Mn | 2.3 | 2.0 | 2.1 |
| Charge #5 | Ionol | 6.3 g | 6.3 g | 6.3 g |
| | Triphenyl Phosphine | 7.8 g | 7.8 g | 7.8 g |
| Charge #6 | Acrylic Acid | 126.7 g | 126.7 g | 126.7 g |
| Charge #7 | Isobornyl Acrylate | 369 g | 332 g | 346 g |
| | N-vinyl-2-pyrrolidone | 369 g | 332 g | 346 g |

Charge #1 was added to a reaction vessel equipped with an agitator, a thermocouple, and a nitrogen inlet. The vessel was sealed and the solution was placed under a nitrogen blanket and heated to 170° C. Charge #2 was added to the reaction vessel over a 2.5-hour period. Fifteen minutes after the addition of Charge #2 was begun, Charge #3 and Charge #4 were started and added to the reaction vessel over a 2-hour period. During the addition of Charges #2–4, the reactor temperature was maintained at 160 to 170° C. and pressures varied from 110 psi to 420 psi. After the addition of Charge #2 was complete, the reaction mixture was held 2 hours at 170° C. The reaction mixture was then cooled to under 60° C. and the residual pressure was released such that ambient pressure was achieved. The reaction vessel was then equipped for atmospheric distillation and heated to 155° C. while being purged with nitrogen. When distillation was complete, the reaction vessel was equipped for vacuum distillation, which was carried out to under 40 mm Hg at 155° C. The mixture was held at under 40 mm Hg vacuum until no further distillate was collected for 30 minutes. The reaction mixture was then cooled to 100° C. Charge #5 was added and allowed to dissolve for 10 minutes. Charge #6 was added over a 15-minute period. The reaction mixture was then held at 100° C. until an acid number of less than 5 (carboxyl content of greater than 11,000) was reached. Charge #7 was added and allowed to agitate while the mixture was cooled to ambient temperature.

EXAMPLE 4

UV curable coating compositions were made using the components and weight shown in the table below. The components were added and mixed using propeller blade agitation with sufficient speed to make a vortex for several minutes to disperse the components uniformly in the coating.

| Description | Coating A (g) | Coating B (g) | Coating C (g) |
|---|---|---|---|
| Resin of Example 1 | 50 | | |
| Resin of Example 2 | | 50 | |
| Resin of Example 3 | | | 50 |
| N-Vinyl-2-Pyrrolidone[1] | 25.6 | 18.0 | 17.6 |
| Isobornyl acrylate[2] | 25.6 | 18.0 | 17.6 |
| Ditrimethylolpropane tetraacrylate[3] | 12.8 | 9.0 | 8.8 |
| Disperbyk 182[4] | .06 | .05 | .05 |
| Syloid ED 30[5] | 1.1 | 1.0 | 0.9 |
| Darocur 1173[6] | 2.2 | 2.0 | 1.8 |
| Darocur 4265[7] | 1.1 | 1.0 | 0.9 |
| Benzophenone[8] | 1.1 | 1.0 | 0.9 |

[1]UV reactive monomer from ISP Technologies Inc., Wayne, N.J.
[2]UV reactive monomer SR 506 from Sartomer Company, Exton, PA.
[3]UV reactive monomer SR 355 from Sartomer Company.
[4]Wetting and dispersing agent from Byk Chemie, Wesel, Germany.
[5]Silica flatting agent from Grace Davison, Chattanooga, TN.
[6]UV Photoinitiator from Ciba Specialty Chemicals Corporation, Tarrytown, NY.
[7]UV Photoinitiator from Ciba Specialty Chemicals Corporation.
[8]UV Photoinitiator from Ciba Specialty Chemicals Corporation.

Oak veneer wood test panels were sanded with 220 grit sandpaper. A commercial alkyd rouge stain (C1180A31, obtained from PPG Industries, Inc., Pittsburgh, Pa.) was rag applied to the test panels and was allowed to stand for two minutes. The excess stain was then wiped from the test panel with a clean cloth rag. The stained test panels were then baked at 150° F. (65.5° C.) for ten minutes.

Coatings A, B, and C were applied as a sealer to the stained oak veneer test panels at a wet film thickness of 1 to 1.5 wet mils, with a Devilbiss MSA hand-held spray gun at 30 to 40 psi air pressure to achieve the desired film thickness. Wet film thickness was verified using a wet film thickness gauge from Paul N. Gardner Company Inc., Pompano Beach, Fla. The coatings were cured by exposure to 750 mJ/cm² UV light by using an 80 W/cm medium pressure mercury UV curing lamps (part no. 25-20008-E), available from Western Quartz Products, Inc., Paso Robles, Calif., then allowed to cool at ambient temperature for an additional five minutes. The UV cured coated veneer test panel was then sanded with 280 grit sandpaper. The completion of the curing step was evidenced by the coating being wet and tacky prior to UV cure and being tack free after the UV exposure.

A second spray application of the same coating was then applied using the same method of application and cure as described above.

The coated test panels were evaluated for ethanol and detergent resistance by placing 15 drops on the coated test panel under a glass cover for a 24-hour test period. The coating was then evaluated on a scale of 0 to 5, where 0 indicates no degradation of the coating and 5 indicates severe degradation of the coating.

| Coated test panels made using | Ethanol | 5% dish washing liquid solution in water |
|---|---|---|
| Coating A | 0.5 | 0 |
| Coating B | 1.0 | 0 |
| Coating C | 0.5 | 0 |

The data demonstrate the ethanol and detergent resistance of the present coating compositions.

The present invention has been described with reference to specific details of particular embodiments thereof. It is not intended that such details be regarded as limitations upon the scope of the invention, except insofar as and to the extent that they are included in the accompanying claims.

We claim:

1. A radiation-curable composition comprising a non-gelled copolymer comprised of at least 30 mole % of residues having the following alternating units of the structure:

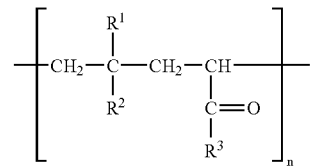

wherein n is an integer from 1 to 10,000; $R^1$ is linear or branched $C_1$ to $C_4$ alkyl; $R^2$ is selected from the group consisting of methyl, linear, cyclic or branched $C_2$ to $C_{20}$ alkyl, alkenyl, aryl, alkaryl and aralkyl; and $R^3$ comprises a moiety that is capable of undergoing a polymerization reaction when exposed to actinic radiation or ionizing radiation; wherein the

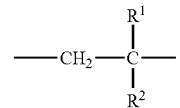

moiety is present in amounts of at least 15 mole % of the copolymer and is derived from isobutylene, diisobutylene, dipentene, 1-octene or isoprenol.

2. The composition of claim 1, comprising (a) the copolymer and (b) at least one photosensitizer or photoinitiator.

3. The composition of claim 1, wherein the actinic radiation is ultraviolet radiation.

4. The composition of claim 1, wherein the ionizing radiation is electron beam radiation.

5. The composition of claim 2, wherein the photosensitizer is one or more selected from the group consisting of benzophenone, anthraquinone, and thioxanthone.

6. The composition of claim 1, wherein the photoinitiator is one or more selected from the group consisting of isobutyl benzoin ether, butyl isomers of butyl benzoin ether, α,α- diethoxyacetophenone, phosphine oxide, and α,α-dimethoxy-α-phenylacetophenone.

7. The composition of claim 1, comprising a thermal polymerization inhibitor.

8. The composition of claim 1, wherein the composition contains co-reactive functional groups.

9. The composition of claim 1, wherein the composition is a thermosetting composition.

10. The composition of claim 9, comprising
(a) the copolymer; and
(b) at least one other component;
(a) containing reactive functional groups and (b) containing functional groups that are reactive with the functional groups of (a).

11. The composition of claim 10, wherein the functional groups of the copolymer are one or more selected from the group consisting of epoxy, carboxylic acid, hydroxy, thiol, isocyanate, capped isocyanate, amide, amine, aceto acetate, methylol, methylol ether, oxazoline, carbamate, and beta-hydroxyalkylamide.

12. The composition of claim 10, wherein the functional groups of (b) are selected from the group consisting of epoxy, carboxylic acid, hydroxy, thiol, amide, amine, oxazoline, aceto acetate, methylol, methylol ether, isocyanate, capped isocyanate, beta hydroxyalkamide, and carbamate.

13. The composition of claim 10, wherein the at least one other component (b) further comprises one or more groups selected from an ethylenically unsaturated group, an epoxy group, and a thiol group.

14. The composition of claim 10, wherein (a) has a functional group equivalent weight of from 100 to 5,000 grams/equivalent.

15. The composition of claim 1, wherein $R^3$ is one or more selected from the group consisting of consisting H and $C_1$ to $C_4$ alkyl; $R^{40}$ is a linking group selected from linear, cyclic, or branched $C_2$ to $C_{20}$ alkylene, alkenylene, arylene, alkarylene, aralkylene, oxyalkylene, and polyoxyalkylene; i is from 1 to 10; and j is from 0 to 100.

16. The composition of claim 1, wherein the

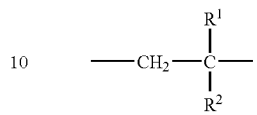

moiety of the copolymer comprises at least 20 mol % of the copolymer.

17. The composition of claim 1, wherein $R^3$ comprises a group having the structure

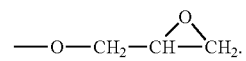

18. The composition of claim 1, wherein the copolymer further comprises one or more residues derived from other ethylenically unsaturated monomers of the general formula:

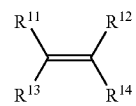

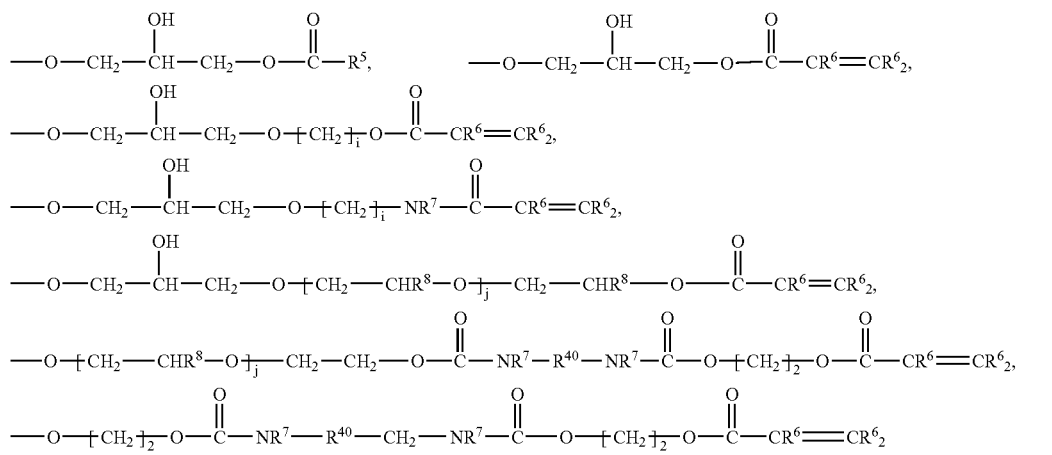

wherein $R^5$ is selected from the group consisting of $C_6$ to $C_{24}$ alkenyl group containing from 1 to 4 ethylenically unsaturated groups and $C_3$ to $C_8$ linear or branched alkenyl groups comprising at least one ethylenically unsaturated group; each occurrence of $R^6$ is independently selected from the group consisting of hydrogen, linear, cyclic or branched $C_1$ to $C_{20}$ alkyl, alkenyl, aryl, alkaryl, aralkyl, alkylol, aralkylol, alkyl thiol and aralkyl thiol, and —COOR$^9$, where $R^9$ is selected from hydrogen and $C_1$ to $C_4$ alkyl; $R^7$ is selected from the group consisting of H and $C_1$ to $C_4$ alkyl; each occurrence of $R^8$ is independently selected from the group wherein $R^{11}$, $R^{12}$, and $R^{14}$ are independently selected from the group consisting of H, halides, $CF_3$, straight or branched alkyl of 1 to 20 carbon atoms, aryl of 6 to 12 carbon atoms, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl and phenyl; $R^{13}$ is selected from the group consisting of H, halides, $C_1$–$C_6$ alkyl, COOR$^{18}$, wherein $R^{18}$ is selected from the group consisting of H, an alkali metal, a $C_1$ to $C_6$ alkyl group, glycidyl, and aryl.

19. The composition of claim 18, wherein the other ethylenically unsaturated monomers are one or more selected from the group consisting of methacrylic monomers and allylic monomers.

20. The composition of claim 1, wherein the copolymer has a number average molecular weight of from 500 to 16,000 and a polydispersity index of less than 4.

21. A substrate, wherein at least a portion of the substrate is coated with the radiation-curable composition of claim 1.

22. A substrate, wherein at least a portion of the substrate is coated with the thermosetting composition of claim 10.

23. A multi-layer composite coating comprising:
   (A) a base coat layer deposited from a base coat composition; and
   (B) a top coat deposited over at least a portion of the base coat layer from a top coat composition; wherein either or both of (A) and (B) are deposited from the radiation-curable composition of claim 1.

24. A multi-layer composite coating comprising:
   (A) a base coat layer deposited from a pigmented film-forming base coat composition; and
   (B) a top coat layer deposited from the radiation-curable composition of claim 1 over at least a portion of the base coat layer.

25. A multi-layer composite coating comprising:
   (A) a base coat layer deposited from the radiation-curable composition of claim 1; and
   (B) a top coat layer deposited from the radiation-curable composition of claim 10 over at least a portion of the base coat layer.

26. A multi-layer composite coating comprising:
   (A) a base coat layer deposited from a base coat composition; and
   (B) a top coat deposited over at least a portion of the base coat layer from a top coat composition; wherein either or both of (A) and (B) are deposited from the thermosetting composition of claim 10.

27. A multi-layer composite coating comprising:
   (A) a base coat layer deposited from a pigmented film-forming base coat composition; and
   (B) a top coat layer deposited from the thermosetting composition of claim 10 over at least a portion of the base coat layer.

28. A multi-layer composite coating comprising:
   (A) a base coat layer deposited from the thermosetting composition of claim 10; and
   (B) a top coat layer deposited from the thermosetting composition of claim 10 over at least a portion of the base coat layer.

29. A substrate, wherein at least a portion of the substrate is coated with the multi-layer composite coating of claim 23.

30. A substrate, wherein at least a portion of the substrate is coated with the multi-layer composite coating of claim 24.

31. A substrate, wherein at least a portion of the substrate is coated with the multi-layer composite coating of claim 25.

32. A substrate, wherein at least a portion of the substrate is coated with the multi-layer composite coating of claim 26.

33. A substrate, wherein at least a portion of the substrate is coated with the multi-layer composite coating of claim 27.

34. A substrate, wherein at least a portion of the substrate is coated with the multi-layer composite coating of claim 28.

35. The radiation-curable composition of claim 1, wherein the

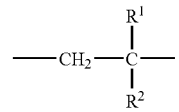

moiety is derived from isobutylene, diisobutylene and 1-octene.

36. The radiation-curable composition of claim 35 comprising:
   (a) the copolymer; and
   (b) at least one other component;
(a) containing reactive functional groups and (b) containing functional groups that are reactive with the functional groups of (a).

37. A substrate wherein at least a portion of the substrate is coated with the radiation-curable composition of claim 35.

38. A substrate wherein at least a portion of the substrate is coated with the radiation-curable composition of claim 36.

39. A multi-layer composite coating comprising:
   (A) a base coat layer deposited from a base coat composition and
   (B) a top coat layer deposited over at least a portion of the base coat layer from a top coat composition; wherein either or both of (A) and (B) are deposited from the radiation-curable composition of claim 35.

40. A multi-layer composite coating comprising:
   (A) a base coat layer deposited from a base coat composition and
   (B) a top coat layer deposited over at least a portion of the base coat layer from a top coat composition; wherein either or both of (A) and (B) are deposited from the radiation-curable composition of claim 36.

41. A substrate, wherein at least a portion of the substrate is coated with the multi-layer composition of claim 39.

42. A substrate, wherein at least a portion of the substrate is coated with the multi-layer composition of claim 40.

* * * * *